United States Patent
Bhagwan et al.

(10) Patent No.: US 7,363,329 B1
(45) Date of Patent: Apr. 22, 2008

(54) METHOD FOR DUPLICATE DETECTION ON WEB-SCALE DATA IN SUPERCOMPUTING ENVIRONMENTS

(75) Inventors: Varun Bhagwan, San Jose, CA (US); Rajesh M. Desai, San Jose, CA (US); Daniel F. Gruhl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/939,378

(22) Filed: Nov. 13, 2007

(51) Int. Cl.
*G06F 17/30* (2006.01)
*G06F 9/46* (2006.01)

(52) U.S. Cl. .................. 707/203; 707/3; 707/204; 718/105

(58) Field of Classification Search ............ None
See application file for complete search history.

(56) References Cited

U.S. PATENT DOCUMENTS 5,913,208 A 6/1999 Brown et al.
6,658,423 B1 12/2003 Pugh et al.

*Primary Examiner*—Hosain Alam
*Assistant Examiner*—Kavita Padmanabhan
(74) *Attorney, Agent, or Firm*—Cantor Colburn LLP; Leonard T. Guzman

(57) ABSTRACT

A method for duplicate detection on web-scale data in a supercomputing environment includes computing a hash of at least one document in a computer system to generate data packets from the at least one document and to generate a fixed size tuple of information from the at least one document, distributing the data packets to each node of the plurality of nodes, applying localized detection techniques to data packets on each node of the plurality of nodes to remove data packet duplicates, redistributing the data packets to each node of the plurality of nodes based on the document fingerprint, reapplying the localized detection techniques on each node to the redistributed packets to remove exact data packet duplicates, and performing a global merge of results of the localized detection techniques in a distributed fashion.

7 Claims, 2 Drawing Sheets

METHOD FOR DUPLICATE DETECTION ON WEB-SCALE DATA IN SUPERCOMPUTING ENVIRONMENTS

TRADEMARKS

IBM® and Blue Gene® are registered trademarks of International Business Machines Corporation, Armonk, N.Y., U.S.A. Other names used herein may be registered trademarks, trademarks, or product names of International Business Machines Corporation or other companies.

BACKGROUND

1. Technical Field

This invention generally relates to duplicate documents. Specifically, this invention relates to efficient duplicate detection on web-scale data in supercomputing environments.

2. Description of Background

Identifying duplicate records is typically termed duplicate detection. Duplicate detection is a key operation if dealing with large volumes of data, and especially if integrating data from multiple sources. Web-scale data is data that may be used within Internet resources such as web-sites, servers, or similar resources. There are multiple reasons for the presence of duplicate data on the Internet, including, mirroring, versioning, different formats (e.g., html format, portable document format, etc.), user-copies, backups, and error-pages (e.g., soft 404 errors). The duplicate data results in a significant portion of the Internet having duplicate content.

SUMMARY

A method for duplicate detection on web-scale data in a supercomputing environment includes computing a fingerprint of at least one document in a computer system to generate data packets from the at least one document and to generate a fixed size tuple of information from the at least one document, distributing the data packets to each node of the plurality of nodes to ensure all elements of the fixed size tuple fit into memory of the plurality of nodes, applying localized detection techniques to data packets on each node of the plurality of nodes to remove data packet duplicates, redistributing the data packets to each node of the plurality of nodes based on the document fingerprint, reapplying the localized detection techniques on each node to the redistributed packets to remove exact data packet duplicates, and performing a global merge of results of the localized detection techniques in a distributed fashion in the computer system such that an entire corpus of web-scale data is represented based on document duplication. According to the method, the computer system includes a plurality of nodes, the plurality of nodes produce the supercomputing environment in a scale-out fashion, the data packets are associated with elements of the fixed size tuple, and the fixed size tuple includes at least a document identifier, a document fingerprint, and a document quality measurement. Furthermore, the data packets are redistributed by dynamically allocating data packets to nodes to ensure all elements of the fixed size tuple fit into memory of the plurality of nodes.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains an exemplary embodiment, together with advantages and features, by way of example with reference to the drawings.

DETAILED DESCRIPTION

According to an exemplary embodiment, a solution has been achieved which significantly decreases the computational time associated with duplicate detection on web-scale data. The decrease in computational time results in more available time for other tasks. According to an exemplary embodiment, a method for duplicate detection may be performed by a supercomputer.

Supercomputers may be divided into two sub-groups, scale-up and scale-out. Scale-up generally refers to computers that are increased in size to make them more powerful than most other available computers. This increase in power is used for computation intensive activities and warrants the term supercomputer if the power increase is relatively large compared to conventionally available equipment. In contrast, scale-out is used to describe a computer system where increased power is derived from sharing data and computational tasks among many nodes. Thus, increases in performance are realized in comparison to a single machine.

Figure 1:
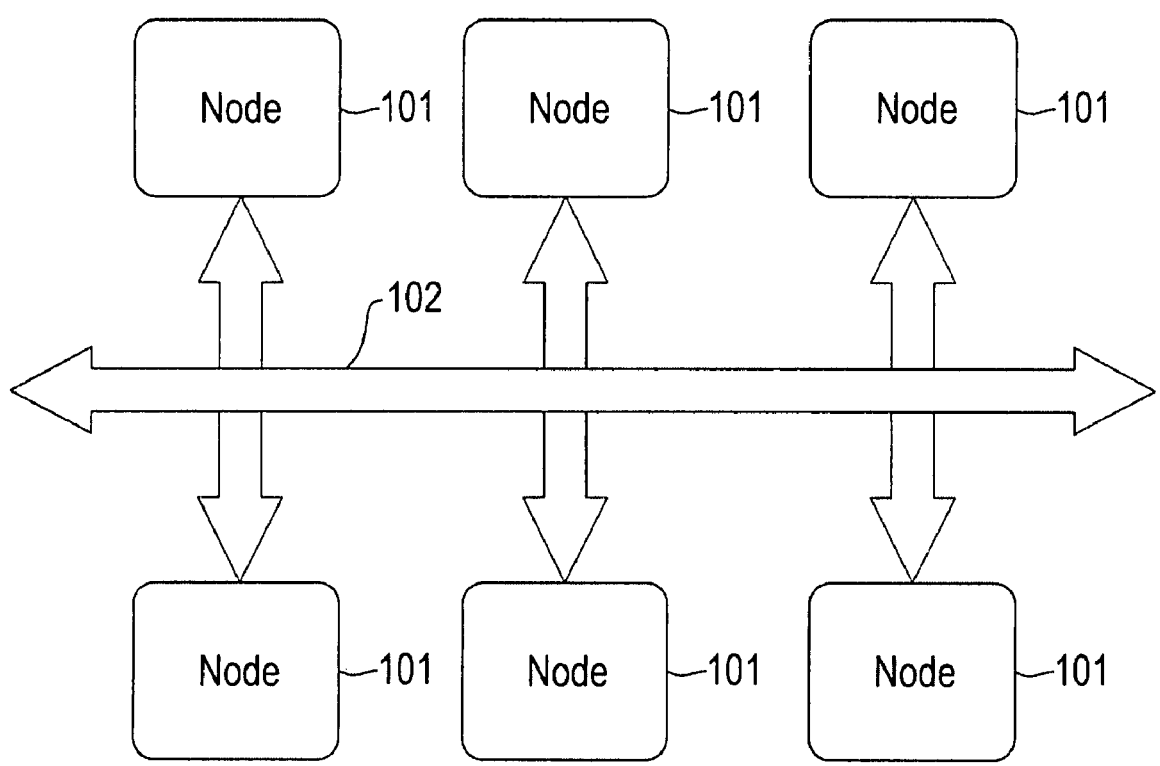
FIG. 1 illustrates a supercomputing environment, according to an exemplary embodiment.

FIG. 1 illustrates a supercomputing environment (or supercomputer configuration), according to an exemplary embodiment. The supercomputing environment 100 includes a plurality of nodes 101. Nodes 101 may be computer apparatuses capable of performing computational tasks. Therefore, each of nodes 101 may include at least one processor, storage media, memory, cache associated with any processor included thereon, and any additional equipment needed for operation. It is noted that the present invention should not be limited to any particular number of nodes, as many more or less nodes than illustrated are applicable to exemplary embodiments of the present invention.

Turning back to FIG. 1, each node of the plurality of nodes may be interconnected via connection 102. For example, connection 102 may be a relatively fast connection system employing switches, hubs, and/or other fast networking equipment. For example, a torus interconnection network, as may be implemented in a BLUE GENE parallel supercomputer, may be used for node interconnections. According to a torus network, nodes are arranged in a three-dimensional cubic grid in which each node is connected to its six nearest neighbors with high-speed dedicated links. Torus networks provide high-bandwidth nearest-neighbor connectivity while also allowing construction of a network without edges.

Turning back to FIG. 1, because each node of the plurality of nodes 101 is interconnected via fast networking equipment, each node of the plurality of nodes 101 may therefore share resources across connection 102. For example, each node may share information contained on storage media, may share instructions, and/or may divide computational tasks among all nodes. Therefore, the connection 102 promotes a scale-out type configuration of the plurality of node 101. More clearly, connection 102 promotes additional computational power derived from the combined computational power of all nodes sharing computational tasks across connection 102 (i.e., nodes are arranged in a scale-out supercomputing fashion).

It is noted that while the cache of each node may not be directly and globally shared, data is shared between nodes, and the logical-to-physical mapping of information is routed around to all nodes in the supercomputing environment 100. Each node may communicate with each other node through the connection 102, eliminating the need for additional wiring. Furthermore, a unique file system, such as a general parallel file system (GPFS), may be employed in the supercomputing environment. For example, the unique file system would allow sequential access to electronic documents stored within the plurality of nodes 101.

Therefore, as described above, an exemplary embodiment of the present invention provides a supercomputing environment where computational tasks may be shared across a plurality of nodes, thereby enabling a relatively faster computational time if compared to a single node. Hereinafter, a method for duplicate detection on web-scale data in a supercomputing environment is described in detail with reference to FIG. 2.

Figure 2:
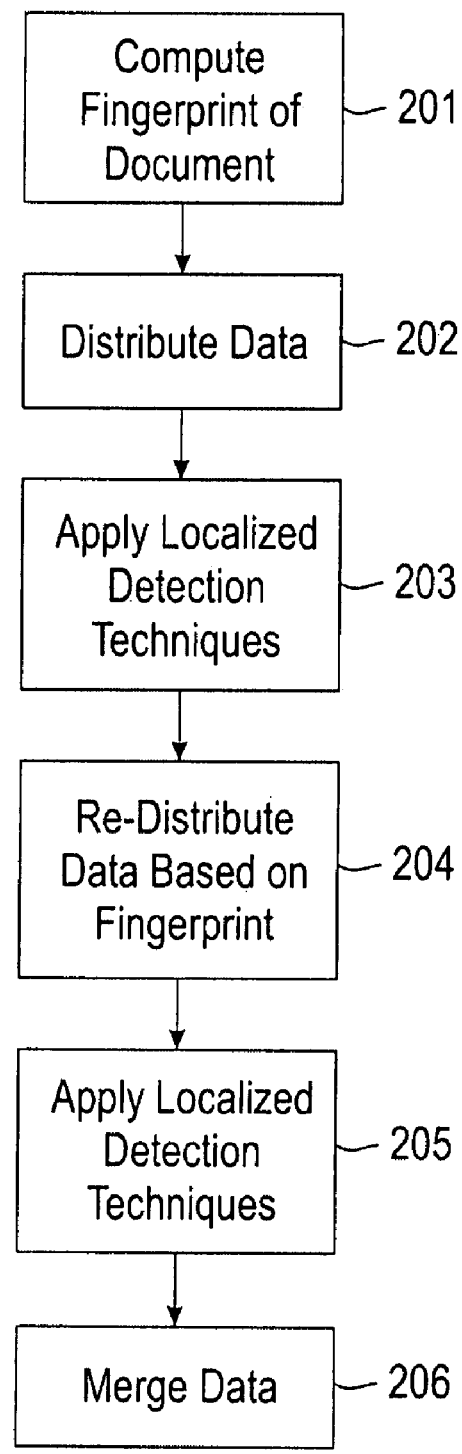
FIG. 2 depicts a method for duplicate detection on web-scale data in a supercomputing environment, according to an exemplary embodiment.

As illustrated in FIG. 2, the method 200 includes computing a fingerprint of a document at block 201. Computing a fingerprint of the document includes reading data from the document (e.g., an electronic document) to generate data packets from the document and generating a three-element tuple (fixed size collection of elements) of the document.

With regards to generating data-packets from the document it is noted that an electronic document may include information or data associated with its content. This data may be separated into packets and associated with different elements of the three-element tuple. The three-element tuple includes a document identification representation (document ID, or DocId), an identifier (fingerprint), and a measure of a document's significance (document quality). Thus, any element of the three-element tuple may be used to sort data packets and identify data packets. For example, if a plurality of documents are being processed, document ID for respective packets may allow for easy identification of which document a particular packet belongs to. Further, a fingerprint for the document may also be used to identify a document's data packet. Thus, if all tuples of a particular document fingerprint are assigned to a node of a supercomputing environment, said node may perform duplicate detection without communication with other nodes in the supercomputing environment. Additionally, the document quality may be used to identify an order or priority of the document compared to other documents.

The method 200 further includes distributing data at block 202. If the data is separated into data packets, the data packets may be distributed based on an element of the three-element tuple and/or to ensure all tuples fit into memory. At this portion of method 200, the data packets may be distributed among nodes of a supercomputing environment based upon the fingerprint of the document the packets belong to. Distributing the data may therefore include dynamically allocating nodes to ensure all tuples fit in memory of nodes. Upon distribution, the data packets are stored in the memory of a corresponding node. Alternatively, the data packets may be distributed in a random fashion. For example, the data packets may be dynamically allocated to nodes to ensure all tuples fit into memory, without taking the document fingerprint into consideration.

The method 200 further includes applying localized detection techniques at block 203. The localized detection techniques may be applied to data packets that have been distributed. For example, the nodes corresponding to data packets may apply these localized detection techniques. The localized detection techniques include sorting data packets by fingerprint and removing duplicate data packets based on a comparison to locate the duplicates within a corresponding node. It is noted that blocks 202 and 203 are optional in exemplary embodiments. For example, as will be described below, blocks 204 and 205 provide sufficient duplicate detection to accurately detect duplicate documents.

The method 200 further includes re-distributing data at block 204. Re-distributing data includes shuffling datapackets among nodes based on a fingerprint of the respective document. Re-distributing the data further includes dynamically allocating nodes to ensure all tuples fit into memory of the nodes. As data packets have been redistributed based on a fingerprint, additional removal of duplicate packets may be performed. Redistributing the data thus includes dynamically allocating nodes to ensure all tuples fit in memory of nodes. Upon redistribution, the data packets are stored in the memory of a corresponding node.

The method 200 further includes applying (or re-applying) localized detection techniques at block 205. The localized detection techniques may be applied to the re-distributed data packets. The localized detection techniques includes sorting data packets based on the fingerprint of a respective document and further sorting by document ID. Exact duplicates of data packets may be removed at each node independent of communication with other nodes. For example, because data packets have been redistributed based on document fingerprints and sorted within the allocated nodes, each node may perform document detection relatively fast, and remove any duplicates from memory. The duplicate detection may be based on comparisons to data packets according to elements of the three-element tuple. Thus similar documents may be allocated to the same node, further increasing the speed of duplicate detection. Upon removal of duplicates, only unique data packets (i.e., documents) should remain in the nodes. Therefore, even if blocks 202 and 203 are omitted, fast duplicate detection may be performed with blocks 204 and 205.

The method 200 further includes merging data at block 206. The merging includes performing a global merge of the results of the localized detection techniques in a distributed fashion in the supercomputing environment. Thus, if documents have been duplicated, by globally merging the results, duplicates are detected and the results are made available.

The results may be organized into sets of duplicated and non-duplicated documents. According to an exemplary embodiment, "unique documents" are documents with a single copy, "document groups" are a set of duplicate documents with the same fingerprint, and "master documents" are the highest ranked documents within a given document group. As such, for an entire corpus of documents, the sets of unique documents and master documents form a complete list of non-duplicate documents. Alternatively, for an entire corpus of documents, a set of duplicated documents may be provided. For example, if a listing of duplicated documents is provided, all non-duplicated documents may be inferred from a listing of all documents.

It is noted, that the above method may be implemented in a supercomputing environment as described with reference to FIG. 1. The supercomputing environment may provide a unique file system allowing fast sequential access of electronic documents stored thereon. This may reduce the complexity of disk reads and writes, with the computation time itself consuming only a fraction of the overall time. For example, if GPFS is employed in the supercomputing environment, on a 6-billion document corpus, a turnaround time of less than about one hour has been achieved in practice of an exemplary embodiment of the present invention.

It is further noted that portions or the entirety of the method may be executed as instructions in a processor of a computer system. Thus, the present invention may be implemented, in software, for example, as any suitable computer program. For example, a program in accordance with the present invention may be a computer program product causing a computer to execute the example method described herein.

The computer program product may include a computer-readable medium having computer program logic or code portions embodied thereon for enabling a processor of a computer apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method for duplicate detection on web-scale data in a supercomputing environment, in accordance with an exemplary embodiment of the present invention.

While an exemplary embodiment has been described, it will be understood that those skilled in the art, both now and in the future, may make various improvements and enhancements which fall within the scope of the claims which follow. These claims should be construed to maintain the proper protection for the invention first described.

What is claimed is:

1. A method for duplicate detection on web-scale data in a supercomputing environment, the method comprising:
    computing a fingerprint of at least one document in a computer system to generate data packets from the at least one document and to generate a fixed size tuple of information from the at least one document, wherein,
        the computer system includes a plurality of nodes,
        the plurality of nodes produce the supercomputing environment in a scale-out fashion,
        the data packets are associated with elements of the fixed size tuple, and
        the fixed size tuple includes at least a document identifier, a document fingerprint, and a document quality measurement;
    distributing the data packets to each node of the plurality of nodes to ensure all elements of the fixed size tuple fit into memory of the plurality of nodes;
    applying localized detection techniques to data packets on each node of the plurality of nodes to remove data packet duplicates;
    redistributing the data packets to each node of the plurality of nodes based on the document fingerprint, wherein,
        the data packets are redistributed by dynamically allocating data packets to nodes to ensure all elements of the fixed size tuple fit into memory of the plurality of nodes;
    reapplying the localized detection techniques on each node to the redistributed packets to remove exact data packet duplicates; and
    performing a global merge of results of the localized detection techniques in a distributed fashion in the computer system such that an entire corpus of web-scale data is represented based on document duplication.

2. The method of claim 1, wherein the computer system employs a unique computer file system allowing for sequential access to a plurality of documents for duplicate detection.

3. The method of claim 1, wherein the entire corpus of web-scale data is represented by at least two lists, the at least two lists including:
    documents with a single copy; and
    highest ranked documents within a given document group, the given document group including a set of duplicate documents with the same fingerprint.

4. The method of claim 1, wherein the entire corpus of web-scale data is represented by one list including all duplicated documents.

5. The method of claim 1, wherein applying localized detection techniques includes:
    sorting data packets by an associated document fingerprint;
    comparing data packets to locate duplicate data packets; and
    removing the located duplicate data packets from the node on which the duplicate data packets reside.

6. The method of claim 1, wherein the computer system employs a torus network connection between the plurality of nodes allowing for fast access to a plurality of documents for duplicate detection.

7. A computer-readable medium including computer instructions that, when executed on a host processor of a computer apparatus, directs the host processor to perform a method for duplicate detection on web-scale data in a supercomputing environment, the method comprising:
    computing a fingerprint of at least one document in a computer system to generate data packets from the at least one document and to generate a fixed size tuple of information from the at least one document, wherein,
        the computer system includes a plurality of nodes,
        the plurality of nodes produce the supercomputing environment in a scale-out fashion,
        the plurality of nodes includes the computer apparatus,
        the data packets are associated with elements of the fixed size tuple, and
        the fixed size tuple includes at least a document identifier, a document fingerprint, and a document quality measurement;
    distributing the data packets to each node of the plurality of nodes to ensure all elements of the fixed size tuple fit into memory of the plurality of nodes;

applying localized detection techniques to data packets on each node of the plurality of nodes to remove data packet duplicates;

redistributing the data packets to each node of the plurality of nodes based on the document fingerprint, wherein, the data packets are redistributed by dynamically allocating data packets to nodes to ensure all elements of the fixed size tuple fit into memory of the plurality of nodes;

reapplying the localized detection techniques on each node to the redistributed packets to remove exact data packet duplicates; and performing a global merge of results of the localized detection techniques in a distributed fashion in the computer system such that an entire corpus of web-scale data is represented based on document duplication.

* * * * *